Patented Apr. 30, 1935

1,999,406

UNITED STATES PATENT OFFICE 1,999,406

METHOD OF PREPARING STABLE CELLULOSE ACETATE

Camille Dreyfus, New York, N. Y., and Herbert E. Martin, Cumberland, Md., assignors to Celanese Corporation of America, a corporation of Delaware No Drawing. Application April 29, 1931, Serial No. 533,792

1 Claim. (Cl. 260—101)

This invention relates to the preparation of organic esters of cellulose and more particularly to the formation of organic esters of cellulose of high acyl value by the further esterification of organic esters of cellulose of lower acyl value.

An object of our invention is to prepare organic esters of cellulose of relatively high acyl value in a practical manner. Other objects of this invention will appear from the following detailed description.

We have found that for many purposes, it is desirable to employ organic esters of cellulose of relatively high acyl value. In the ordinary method of making organic esters of cellulose, such as cellulose acetate, cellulose is acetylated by means of acetic anhydride in the presence of a catalyst and a solvent such as acetic acid. At the completion of the reaction, there is formed a substantial fully acetylated cellulose which becomes dissolved in the acetic acid present. In order to work the cellulose acetate so formed into a commercial form, it is necessary to hydrolyze or ripen the same by adding water to the solution of cellulose acetate formed during the acetylation, and cause the cellulose acetate to hydrolyze to form a product of lower acetyl value, whereupon the cellulose acetate is precipitated by the addition of a large amount of water, and the precipitated cellulose acetate may be washed and given any other desired purifying treatment. In order to obtain a cellulose acetate that can be precipitated in a form that may be readily washed and purified to a desired degree of stability, it is generally necessary to hydrolyze the same to a given maximum acetyl value.

We have found that organic esters of cellulose of high acyl value may be made by re-esterifying a purified organic ester of cellulose of lower acyl value by means of an esterifying agent, and that the degree of esterification can be controlled at will to form an organic ester of any desired acyl value.

In accordance with our invention, we prepare organic esters of cellulose of higher degree of esterification by subjecting the same to an esterifying agent until the desired degree of esterification is obtained.

While this invention will be described specifically in connection with the treatment and preparation of cellulose acetate, it is applicable to other organic esters of cellulose such as cellulose formate, cellulose propionate and cellulose butyrate. As a starting material there is employed a cellulose acetate which is in the form ready for ordinary commercial use, that is a cellulose acetate which has been ripened, washed and stabilized and having, for instance, an acetyl value of less than 45 (say as low as 10%) to 57% (determined as acetic acid).

The organic ester of cellulose of lower degree of esterification is treated with an esterifying agent containing acetic anhydride, acetyl chloride, propionic anhydride, propionyl chloride, butyric anhydride, butyryl chloride, formic acid, etc., depending upon the cellulose ester that is being treated. The amount of esterifying agent employed may vary from 50 to 300% of the weight of the organic ester of cellulose being treated, depending on the particular cellulose ester employed and the amount of acyl groups to be added.

An esterifying catalyst is added to the esterifying agent and while such catalyst is preferably a mild catalyst, such as zinc chloride, a mixture of zinc chloride and hydrochloric acid, phosphoric acid and the like, stronger catalysts such as sulfuric acid may be used. The amount of catalyst may vary from 1 to 10% or more of the weight of the cellulose acetate or other organic ester of cellulose being treated, depending on the catalyst and the degree of esterification desired. When weaker catalysts such as zinc chloride, phosphoric acid, or a mixture of zinc chloride and hydrochloric acid are employed, the final cellulose ester is quite stable so that no further stabilization is required.

The esterifying mixture may or may not contain diluents or solvents. If no diluents or solvents are employed, the cellulose acetate may be merely moistened with a mixture of acetic anhydride having the catalyst dissolved or mixed therein. Examples of diluents that may be employed in the case of cellulose acetate are benzene and carbon tetrachloride, and the amount employed is such as to prevent the dissolving of the organic ester in the esterifying mixture. If desired a solvent such as acetic acid may be present during the esterification, but this is less preferable, since this requires further treatments such as precipitation of the cellulose acetate. The temperature of esterification may be room temperatures or temperatures from below 0° to 80° C. or more depending on the catalyst employed and the results desired.

In one form of this invention, the cellulose ester is treated with a corresponding esterifying agent. Thus a cellulose acetate of lower acetyl value may be re-acetylated to form a cellulose acetate of higher acetyl value. On the other hand mixed esters of cellulose may be formed by employing an esterifying agent containing an acyl radical different from that of the organic ester of cellulose being esterified. Thus cellulose acetate of lower acetyl value may be further esterified with propionic anhydride or butyryl anhydride; while cellulose propionate or cellulose butyrate may be further esterified with acetic anhydride.

By this invention there may be made organic esters of cellulose of high acyl value up to a fully esterified cellulose. Thus cellulose acetate having an acetyl value of 58 to 62% or more (determined as acetic acid) may be formed. Generally a mere washing and drying of the product formed during the re-esterification is sufficient to present the same in commercial form.

The cellulose acetate or other organic ester of cellulose made by this invention may be dissolved in suitable solvents and worked up in known or suitable manner to form artificial filaments or silk, bristles, straw and the like, which are more resistant to the delustering action of boiling water or wet steam than the cellulose acetate from which it is formed.

Highly ornamental effects may be obtained by associating together yarn made from cellulose acetate prepared in accordance with this invention, and which is more resistant to delustering, together with yarn made from the acetone-soluble cellulose acetate employed as the starting material, and which is readily delustered, and then subjecting such fabric to boiling water or other hot aqueous media, whereby differential lustre effects may be produced.

The highly esterified cellulose acetate or other organic ester of cellulose formed by this invention may be used for making films for photographic or other purposes, lacquers, coating compositions, plastic compositions, etc., in any known or suitable manner. The cellulose acetate may be made in the form of powder in admixture with plasticizing agents and other desired materials, and such powder may be used for molding under heat and pressure.

In order further to illustrate our invention, but without being limited thereto, the following specific examples are given.

*Example I*

A cellulose acetate that is soluble in acetone and having an acetyl value of 54.5% (determined as acetic acid) is employed for re-acetylation. This cellulose acetate may be prepared by acetylating cellulose with a mixture of acetic anhydride, acetic acid and sulfuric acid which may then be ripened, washed, stabilized and dried in a form ready for ordinary uses. The cellulose acetate may, for instance, be prepared by any of the processes described in the U. S. patents to Henry Dreyfus Nos. 1,278,885; 1,280,974; 1,280,975 and particularly 1,708,787.

The cellulose acetate is treated with an acetylating mixture in the following proportions:

| | Parts by weight |
|---|---|
| Cellulose acetate | 30 |
| Strong acetic anhydride | 65 |
| Zinc chloride (catalyst) | 0.5 |
| Hydrochloric acid (35% aqueous solution) | 1.2 |
| Benzene (diluent) | 265 |

The temperature of reaction is from 20 to 32° C. and time of reaction is 3 hours. The liquid is then drained from the cellulose acetate, and the cellulose acetate treated with a large quantity of water from which the residual benzene is distilled. The cellulose acetate is then separated and dried. The product is quite stable so that no stabilization treatment is required.

The resulting cellulose acetate has an acetyl value of 58.2% (determined as acetic acid), is soluble in methylene chloride, forms a clear solution, is soluble in hot chloroform, and is insoluble in acetone.

*Example II*

The cellulose acetate described in Example I is treated with an acetylation mixture having the same composition as that used in Example I, with the exception that no hydrochloric acid is used. The time and temperature of re-acetylation are substantially the same as that in Example I.

There is formed a stable cellulose acetate having an acetyl value of 55.8% and which is soluble in acetone.

*Example III*

The cellulose acetate described in Example I is treated with an acetylating mixture in the following proportions:

| | Parts by weight |
|---|---|
| Cellulose acetate | 30 |
| Strong acetic anhydride | 65 |
| Phosphoric acid (85% concentration) | 0.5 |
| Benzene | 265 |

The time and temperature of treatment is the same as in Example I.

There is formed a stable cellulose acetate having an acetyl value of 58.5% which is soluble in acetone, very soluble in methylene chloride, and difficultly soluble in hot chloroform.

It is to be understood that the foregoing detailed description is given merely by way of illustration and that many variations may be made therein, without departing from the spirit of our invention.

Having described our invention, what we desire to secure by Letters Patent is:

The process of forming stable cellulose acetates, which comprises acetylating cellulose in the presence of sulphuric acid as catalyst, hydrolyzing the product to form an acetone soluble product, stabilizing the same and then esterifying in the presence of a weak catalyst selected from the group consisting of zinc chloride, phosphoric acid and a mixture of zinc chloride and hydrochloric acid, to form a stable product of high acetyl value.

CAMILLE DREYFUS.
HERBERT E. MARTIN.